United States Patent
Bommer et al.

(10) Patent No.: US 9,853,499 B2
(45) Date of Patent: Dec. 26, 2017

(54) WIRELESS POWER HARVESTING ALONG MULTIPLE PATHS IN A REVERBERENT CAVITY

(75) Inventors: Jason P. Bommer, Tacoma, WA (US); Arun Ayyagari, Seattle, WA (US)

(73) Assignee: The Boeing Company, Chicago, IL (US)

(*) Notice: Subject to any disclaimer, the term of this patent is extended or adjusted under 35 U.S.C. 154(b) by 930 days.

(21) Appl. No.: 13/533,934

(22) Filed: Jun. 26, 2012

(65) Prior Publication Data

US 2014/0008989 A1     Jan. 9, 2014

(51) Int. Cl.
*H02J 17/00* (2006.01)
*H01Q 1/22* (2006.01)
*H01Q 1/28* (2006.01)

(52) U.S. Cl.
CPC ........... *H02J 17/00* (2013.01); *H01Q 1/225* (2013.01); *H01Q 1/2225* (2013.01); *H01Q 1/28* (2013.01)

(58) Field of Classification Search
CPC .......... H02J 17/00; H01Q 1/225; H01Q 1/28; H01Q 1/2225
USPC ....................................................... 307/104
See application file for complete search history.

(56) References Cited

U.S. PATENT DOCUMENTS

| | | | |
|---|---|---|---|
| 5,602,540 A * | 2/1997 | Spillman, Jr. ............ | G01D 5/48 340/870.31 |
| 5,708,427 A * | 1/1998 | Bush ..................... | G05D 1/0261 180/168 |
| 5,874,786 A * | 2/1999 | McVey .................... | H02J 1/10 244/172.7 |
| 6,031,334 A * | 2/2000 | Meyer ................... | F03H 1/0018 313/359.1 |
| 6,154,383 A * | 11/2000 | Cardwell, Jr. ........ | H02M 3/337 363/41 |
| 8,026,857 B2 | 9/2011 | Bommer | |
| 9,086,060 B1 * | 7/2015 | Stickelmaier ......... | F03H 1/0018 |
| 2003/0052684 A1 * | 3/2003 | Nelson et al. ................. | 324/329 |
| 2003/0069051 A1 * | 4/2003 | Pretre ..................... | H02J 17/00 455/572 |
| 2004/0009092 A1 * | 1/2004 | Diaferia ................ | A01M 19/00 422/21 |

(Continued)

FOREIGN PATENT DOCUMENTS

| | | |
|---|---|---|
| CN | 101577505 A | 11/2009 |
| JP | H10295043 A | 11/1998 |

(Continued)

OTHER PUBLICATIONS

Hill et al., "Aperture Excitation of Electrically Large, Lossy Cavities," IEEE Transaction on Electromagnetic Compatibility, vol. 36, No. 3, pp. 169-178 (Aug. 1994).

(Continued)

*Primary Examiner* — Jared Fureman
*Assistant Examiner* — Emmanuel R Dominique
(74) *Attorney, Agent, or Firm* — Miller, Matthias & Hull LLP

(57) ABSTRACT

An apparatus comprises a structure including a cavity that, when excited with electromagnetic energy, produces an electric field having randomized distribution of field amplitude and polarity. The apparatus further comprises a sensor within the cavity. The sensor has a plurality of antennas for wirelessly harvesting operating power along different paths within the cavity.

20 Claims, 5 Drawing Sheets

(56) References Cited

U.S. PATENT DOCUMENTS

| | | | | |
|---|---|---|---|---|
| 2004/0212496 | A1* | 10/2004 | Villaseca | H01Q 1/22 340/539.12 |
| 2006/0072265 | A1* | 4/2006 | Bucella | H02J 13/0096 361/90 |
| 2007/0101809 | A1* | 5/2007 | Roesner | G01F 23/2845 73/290 R |
| 2007/0114422 | A1* | 5/2007 | Berkcan | B64D 43/00 250/358.1 |
| 2007/0296393 | A1* | 12/2007 | Malpas | A61B 5/0002 323/355 |
| 2008/0058029 | A1 | 3/2008 | Sato et al. | |
| 2008/0064413 | A1* | 3/2008 | Breed | B60C 11/24 455/456.1 |
| 2009/0108840 | A1* | 4/2009 | Givens | 324/251 |
| 2009/0184877 | A1 | 7/2009 | Boomer | |
| 2009/0219158 | A1 | 9/2009 | Nikitin et al. | |
| 2010/0045309 | A1* | 2/2010 | Zou | A61B 5/053 324/663 |
| 2010/0253156 | A1 | 10/2010 | Iott et al. | |
| 2011/0018498 | A1 | 1/2011 | Soar | |
| 2011/0018686 | A1 | 1/2011 | Fahley et al. | |
| 2011/0181426 | A1* | 7/2011 | Bucciero | G01F 23/0069 340/612 |
| 2011/0213208 | A1 | 9/2011 | McKenna et al. | |
| 2012/0133213 | A1* | 5/2012 | Borke | H02J 17/00 307/104 |
| 2012/0158321 | A1 | 6/2012 | Bommer et al. | |
| 2012/0168645 | A1* | 7/2012 | Atzmony | H02J 17/00 250/492.1 |
| 2012/0223595 | A1* | 9/2012 | Oodachi | H02J 5/005 307/104 |
| 2012/0248893 | A1* | 10/2012 | Teggatz | H01F 38/14 307/104 |
| 2013/0204202 | A1* | 8/2013 | Trombly | A61M 5/172 604/207 |
| 2014/0059443 | A1* | 2/2014 | Tabe | H04L 51/32 715/738 |
| 2014/0137537 | A1* | 5/2014 | Stickelmaier | B64G 1/428 60/202 |

FOREIGN PATENT DOCUMENTS

| | | | | |
|---|---|---|---|---|
| JP | | 2008086196 A | 4/2008 | |
| WO | WO 2011/073667 A1 * | | 6/2011 | ........... G05D 1/0261 |

OTHER PUBLICATIONS

Hagerty et al., "Recycling Ambient Microwave Energy with Broad-Band Rectenna Arrays," IEEE Transaction on Microwave Theory and Techniques, vol. 52, No. 3, pp. 1014-1024 (Mar. 2004).

Examination Report for related Australian Application No. 2013281230; report dated Apr. 14, 2016.

Office Action for related Chinese Application No. 2013800260144; report dated May 3, 2016.

Office Action for related Chinese Application No. 2015-520172; report dated Jan. 5, 2017.

* cited by examiner

WIRELESS POWER HARVESTING ALONG MULTIPLE PATHS IN A REVERBERENT CAVITY

BACKGROUND

In commercial aircraft, sensors may be located in fuel tanks to measure temperature, moisture content, fuel level, oxygen level, and other physical quantities. The sensors receive electrical power from a source outside the fuel tank, since Federal regulations prohibit power storage devices such as batteries and supercapacitors from being located within the fuel tank.

Electrical power may be supplied to the sensors by wires, which extend into the fuel tanks. The wires may also be used for data communications. However, the wires add weight to the aircraft. The added weigh increases aircraft operating costs. The wires also increase maintenance costs due to inspection.

In the alternative, the sensors may harvest energy from ambient sources (e.g., vibration, thermal and solar). However, harvesting from ambient sources may be unreliable and inconsistent, and, for confined structures such as fuel tanks, may not be viable.

SUMMARY

According to an embodiment herein, an apparatus comprises a structure including a cavity that, when excited with electromagnetic energy, produces an electric field having a randomized distribution of field amplitude and polarity. The apparatus further comprises a sensor within the cavity. The sensor has a plurality of antennas for wirelessly harvesting operating power along different paths within the cavity.

According to another embodiment herein, a method comprises operating a sensor in a reverberant cavity, including harvesting energy incident from multiple directions and orientations within the cavity, combining the harvested energy, and using the combined energy to power the sensor.

According to another embodiment herein, a vehicle comprises a fuel tank, and a fuel tank sensor mounted within the fuel tank. The sensor has a plurality of antennas for wirelessly harvesting energy along different paths within the tank.

According to another embodiment herein, an aircraft comprises a fuel tank, and a plurality of fuel tank sensors within the fuel tank. At least some of the fuel tank sensors have a plurality of antennas for wirelessly harvesting operational power incident from multiple directions and orientations within the tank.

According to another embodiment herein, a sensor comprises a plurality of antennas directed along different paths, and a circuit for combining power harvested on the antennas. The antennas are tuned to different frequencies. The sensor is configured to become non-operational if power is not received on any of the antennas. The sensor further comprises a transducer for using the power from the circuit to measure a physical quantity.

According to another embodiment herein, a sensor system comprises a plurality of sensors for performing measurements of physical parameters, each sensor having a plurality of antennas and a circuit for harvesting operational energy, the antennas tuned to different frequencies.

These features and functions may be achieved independently in various embodiments or may be combined in other embodiments. Further details of the embodiments can be seen with reference to the following description and drawings.

DETAILED DESCRIPTION

Figure 1:
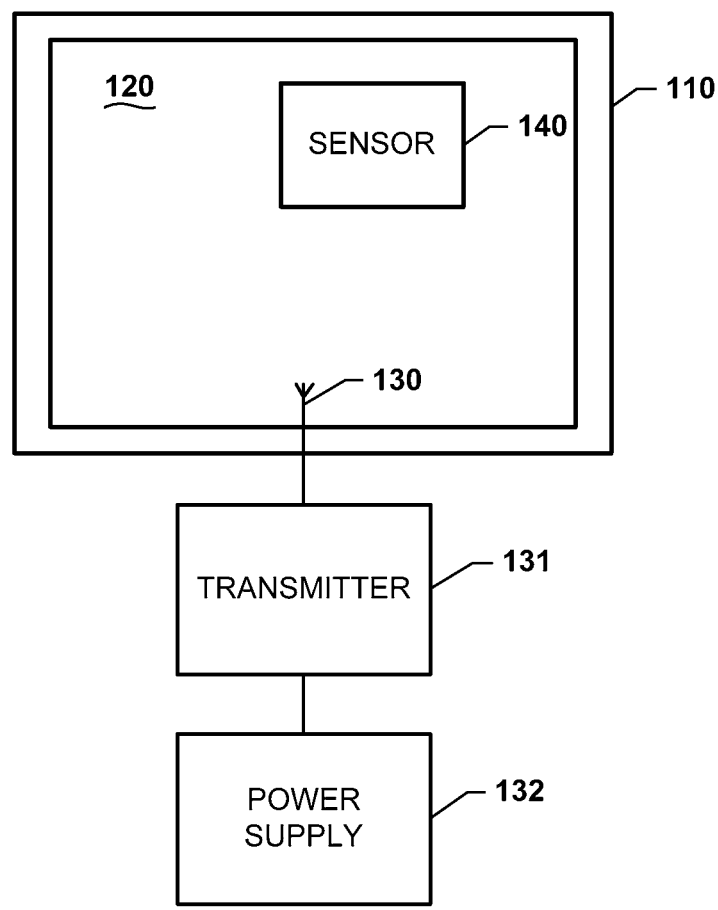
FIG. 1 is an illustration of an apparatus including a structure having a cavity and a sensor within the cavity.

Reference is made to FIG. 1, which illustrates a structure 110 having a cavity 120, and a source for exciting the cavity with electromagnetic energy. The excitation source includes a radiating element 130 inside the cavity 120, a transmitter 131 and a power supply 132 outside of the cavity 120. Although shown outside of the cavity, the transmitter 131 may instead be located inside.

When excited with electromagnetic energy, the cavity 120 reflects the energy and produces a standing wave electric field. Walls 122 of the cavity 120 may be made of a material that reflects the electromagnetic energy (e.g., metal), or the walls 122 may be coated or covered with a material (paint or foil) that reflects the electromagnetic energy. Wavelength of the electromagnetic energy is small in comparison to the dimensions of the cavity 120. The smallest dimension of the cavity 120 may be several wavelengths long. For example, the cavity 120 of a fuel tank of a commercial aircraft may be excited with microwave energy.

Power at any given point in the cavity 120 is governed by boundary conditions of the cavity 120. If the boundary conditions do not fluctuate, and excitation is continuous, an electric field having a standing wave pattern will be produced. The electric field will vary between minimum and maximum values. However, even slight fluctuations in the boundary conditions influence the locations of the minimum and maximum values within the cavity 120. The randomness may result from small perturbations in position, orientation, frequency, and geometric state of objects within the cavity 120. If the boundary conditions change randomly, the location of the minimum and maximum values change randomly. Consequently, the electric field within the cavity 120 has a randomized distribution of field amplitude and polarity.

Consider a structure such as a fuel tank of a commercial aircraft. Walls of the fuel tank provide relatively fixed boundaries. So do other material surface boundaries within the fuel tank, such as tubing, ribs and brackets. However, they demonstrate varying flexure within reasonable design limits due to dynamic structural and aerodynamic loading. Moreover, any sloshing or other movement of the fuel in the tank will cause the boundary conditions to change.

Now consider a structure such as a passenger cabin of a commercial aircraft. Walls of the cabin provide relatively fixed boundaries. However, the cabin walls also demonstrate varying flexure within reasonable design limits due to dynamic structural and aerodynamic loading. Moreover, people within the cabin also provide material surface boundaries. As people move within the cabin, the boundary conditions change.

A sensor 140 is located within the cavity 120. As the cavity 120 is excited with electromagnetic energy, the sensor 140 sees an electric field having minimum and maximum values at random locations within the cavity 120. The sensor 140 also sees dead zones, that is, zones of extremely low instantaneous energy. The dead zones may move around the cavity 120 as dictated by fluctuation of the boundary conditions.

The applicants have realized that the fluctuations in boundary conditions within the cavity 120 may used advantageously. The cavity 120 is excited to behave as a reverberant cavity, and the sensor 140 is configured to wirelessly harvest energy from multiple directions and orientations within the cavity 120, combine the harvested energy, and use the combined energy to perform a sensor function.

In some embodiments, the excitation itself may cause the randomized distribution of field amplitude and polarity. The amplitude of the electric field is a function of frequency. A pulsed excitation will have a different frequency content than a continuous wave sinusoid. A pulsed chain of waveforms of different shapes could be helpful in shifting the modes around so that nulls are only present for a limited time.

Figure 2:
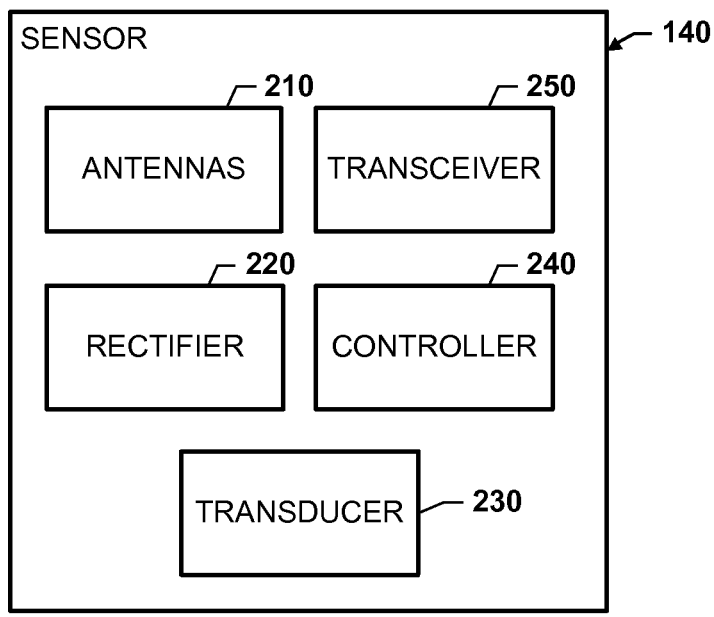
FIG. 2 is an illustration of a sensor that harvests energy along different paths within the cavity, combines the harvested energy, and uses the combined energy to perform a sensor function.

Additional reference is made to FIG. 2, which illustrates an example of the sensor 140. The sensor 140 has a plurality of antennas 210 for wirelessly harvesting operating power along different paths within the cavity 120. The antennas 210 are connected to a rectifier 220 for rectifying and combining the power harvested on the antennas 210. The rectifier 220 may be similar to doubling diodes for RFID tags.

The sensor 140 further includes a transducer 230 and a controller 240 for system power management, processing data and controlling measurement and transmission of data, and a transceiver 250 for communicating data via the antennas 210. For example, the controller 240 may control the rate at which an analog signal from the transducer 230 is sampled and passed to the transceiver 250 for transmission. The controller 240 may also perform digitizing and converting or scaling in accordance with transducer requirements.

The rectifier 220 supplies operating power to all components requiring DC power, including the controller 240, transducer 230, and the transceiver 250. These components use only the harvested power for operation. When powered up, the controller 240 takes an analog measurement from the transducer 230 and measures a physical parameter (e.g., temperature) within the cavity 120. The sensor 140 does not have any appreciable power storage. The sensor 140 is non-operational when not supplied with harvested power. Thus during a power fade, the sensor 140 is configured to become non-operational.

Figure 3:
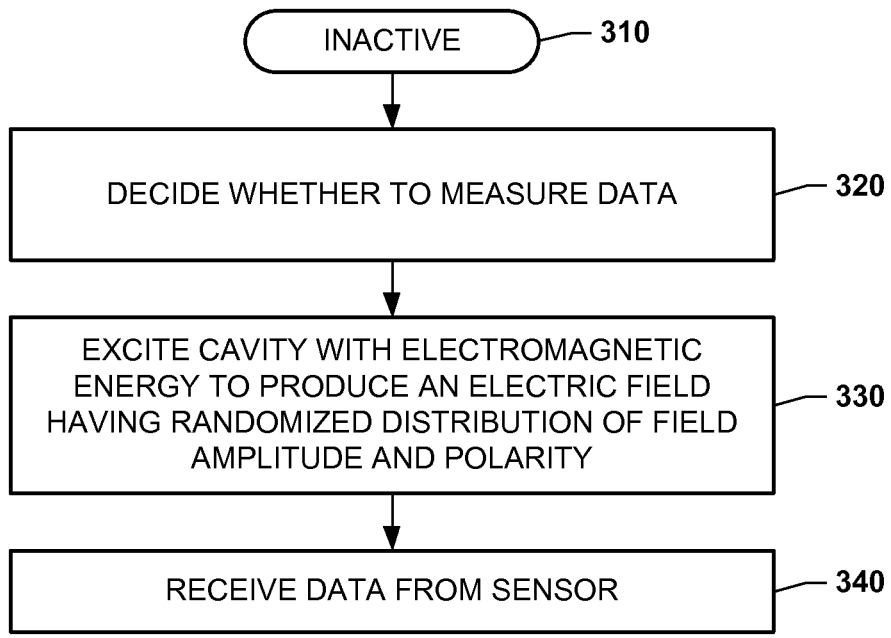
FIG. 3 is an illustration of a method of harvesting electrical power within a reverberant cavity.

Reference is made to FIG. 3, which illustrates a method of using the sensor 130 in the reverberant cavity 120. At block 310, the sensor 130 is inactive. The sensor 130 is not receiving power and, because it does not store any appreciable power, is not collecting data.

At block 320, a decision is made whether to measure data. In some embodiments, the sensor 140 may be programmed to make measurements according to a schedule and assume that power will be delivered accordingly. In the event that power is not available at a scheduled time, the measurement is not performed and a sample is skipped. In other embodiments, a measurement may be made every time the sensor 140 sees power. The decision to excite the cavity 120 may be made by a larger system.

At block 330, the sensor 140 is activated by exciting the cavity 120 with electromagnetic energy to produce an electric field having randomized distribution of field amplitude and polarity. The sensor 140 harvests operating energy from multiple directions and orientations within the cavity 120, rectifies and combines the harvested energy, and uses the harvested energy to measure a physical parameter of the cavity 120. The sensor 140 may also use the harvested energy to transmit data back to a controller.

At block 340, sensor data is received from the sensor 140. The excitation source may also include a transceiver that handles the bi-directional data and command exchange.

Thus, sensor data is obtained without having to run wires across the cavity 120. Moreover, the data collection is consistent and reliable, unlike data collection that relies on ambient sources for energy.

The use of a reverberant cavity offers additional advantages over a free space system. Average power tends be greater in a reverberant cavity. Average power as used herein refers to power received at many locations near a point, or at one precise location over multiple frequencies. While Instantaneous power at any single point or discrete frequency within the cavity may be greater, it will fluctuate wildly. Dead zones can occur. The fluctuations are dampened and dead zones avoided by obtaining average power from different paths instead of instantaneous power at a single point.

Moreover, the average power is not dependant on position in the cavity. This is not the case in a free space system or in an environment where only a few reflections take place.

Another advantage is that antenna placement and orientation in a reverberant cavity are far less critical when compared to a free space system, since the energy will ultimately get to the receiver from one of the many reflections in the cavity. In some embodiments, orientation and placement of the antennas in a reverberant cavity may be arbitrary.

Still another advantage is that the antennas are not limited to a specific shape. The antenna shape may be dictated by form factor or integration with the transducer.

For a sensor herein, the electronics may be incorporated into just a few components and chips, which are mounted to a small circuit board. The circuit board may be packaged with the antennas. In some embodiments, the package may be hermetically sealed.

Figure 4A:
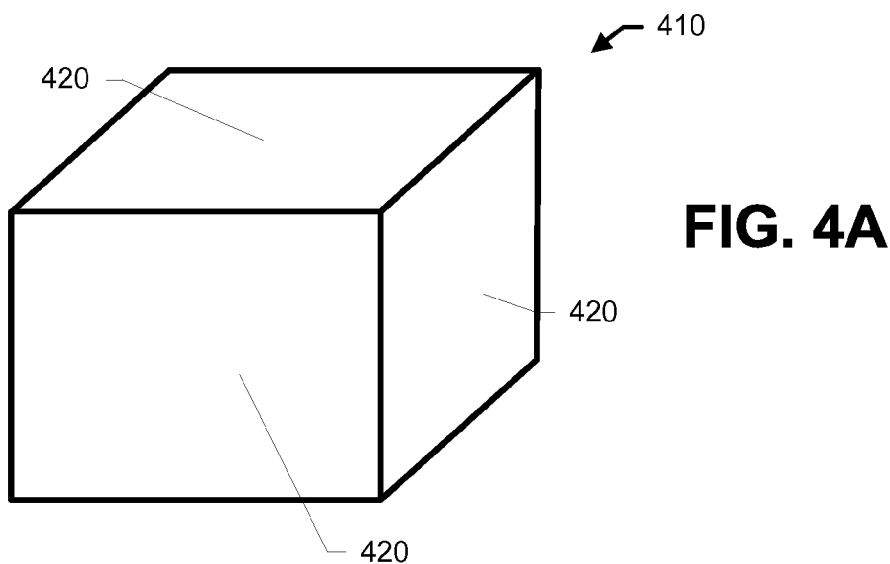
FIGS. 4A, 4B and 4C are illustrations of different configurations of the sensor.
Figure 4B:
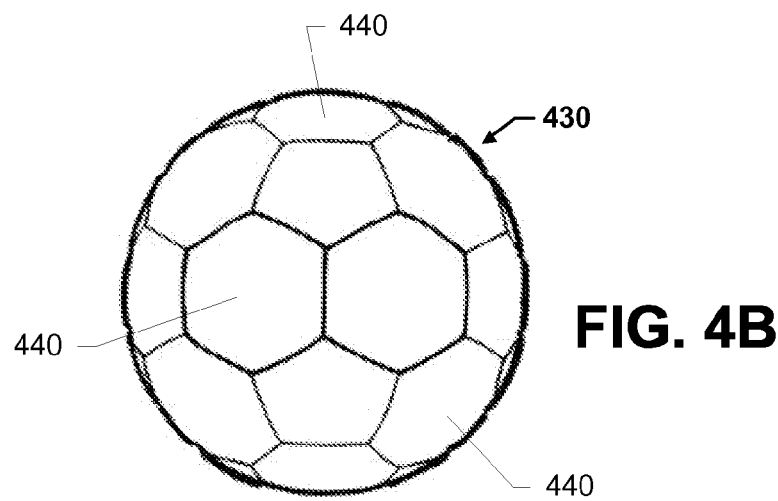
Figure 4C:
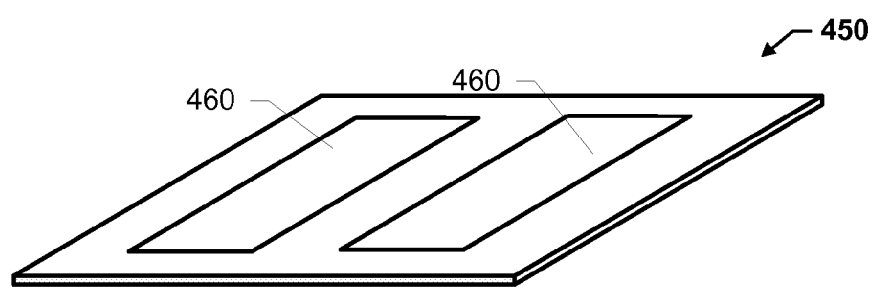

A sensor herein is not limited to any particular configuration. Examples of three different configurations of the sensor 140 are illustrated in FIGS. 4A, 4B and 4C. These three configurations utilize different displacement and orientation of the antennas.

FIG. 4A illustrates a sensor 410 having the shape of a cube. The cube-shaped sensor 410 has surface antennas 420 that are spatially separated and oriented in orthogonal planes. Some embodiments of the cube-shaped sensor 410 may have antennas 420 on all six surfaces. Other embodiments may have antennas 420 on fewer than six surfaces. Spacing the antennas 420 one-quarter or one-half wavelength apart will increase the likelihood of avoiding a null. The orthogonal orientation further increases the likelihood of avoiding a null.

FIG. 4B illustrates a sensor 430 having the shape of a sphere. Radius of the sphere-shaped sensor 430 is a fraction of the wavelength of the operating frequency. Antennas 440 are located on different patches of the sphere-shaped sensor 430. Power may be harvested along orthogonal and/or non-orthogonal planes.

FIG. 4C illustrates a sensor 450 having a shape of a card. Antennas 460 may lie in the same plane, but are separated by a fraction of a wavelength (e.g., one-quarter or one-half wavelength). An advantage of the card-shaped sensor 450 is that it may have a "peel and stick" surface for adhering to a surface within the cavity.

In these three configurations, all sensor electronics may be contained and potted behind the surface antennas. In some embodiments, the potting may be placed on the outside surface of the antennas.

A sensor herein is not limited to the configurations illustrated in FIGS. 4A, 4B and 4C. Other configurations include, but are not limited to, independent axis arrays and forks.

Some embodiments of a sensor herein may use patch antennas. Other embodiments may use folded dipoles or spiral antennas. The antenna types may depend on geometry constraints and power requirements of the sensor.

Moreover, a sensor herein is not limited to fixed antennas. In some embodiments, the antennas may be moved to enhance power harvesting. For example, the electronics may include self calibrating mechanisms via an optimization loop for evaluating a DC voltage from the rectifier, and piezoelectric devices may move the antennas until maximum voltage is achieved.

An apparatus herein is not limited to a single sensor within a cavity. Multiple sensors may be used. In some embodiments, not all sensors harvest energy along multiple paths. If a sensor is located near the radiating element 130 and its line-of-sight path is not obstructed, it may perform better if its antennas are aligned. In addition to the reflected paths, the line-of-sight path will be present and strongest.

Some embodiments of an apparatus herein may include a plurality of sensors that harvest energy having a single frequency. The antennas of each sensor are tuned to that single frequency. Or, the sensor includes different antennas that are turned to different frequencies.

However, an apparatus herein is not limited to the harvesting of energy at a single frequency. In some embodiments, the cavity is excited with electromagnetic energy at two or more frequencies, and the sensors harvest power at the multiple frequencies. Some examples will now be provided. In these examples, harvestable energy is a function of input power level, and frequency.

As a first example, the different antennas of a sensor are tuned to the different available frequencies. The sensor harvests power at the different frequencies, combines the harvested power, and uses the combined power for operation. There is no need to switch between frequencies. If the sensor (for whatever reason) cannot harvest power at a certain frequency, that frequency simply won't contribute to the combined power.

Consider the cube-shaped sensor. Antennas on parallel faces may be tuned to the same frequency, while antennas on orthogonal faces may be tuned to different frequencies. Such a sensor may harvest power at three different frequencies in three orthogonal directions.

As a second example, the antennas of a sensor are turned to the same frequency, but different sensors are turned to different frequencies. This may be done to exploit a physical constraint of the cavity. Consider a large cavity having a confined compartment with a very small aperture. Sensors tuned to a lower frequency are located in the cavity. However, the lower frequency may be shielded by the small aperture, and does not couple into the aperture. Therefore sensors located in the compartment are tuned to a higher frequency that can couple into the aperture.

A structure herein is not limited to anything in particular. Examples include, but are not limited to, cargo containers, cavity-containing structures in submarines, cavity-containing structures below ship decks, cavity-containing structures in factories, refrigerators and freezers, and facilities designed to be shielded from outside environment.

Figure 5:
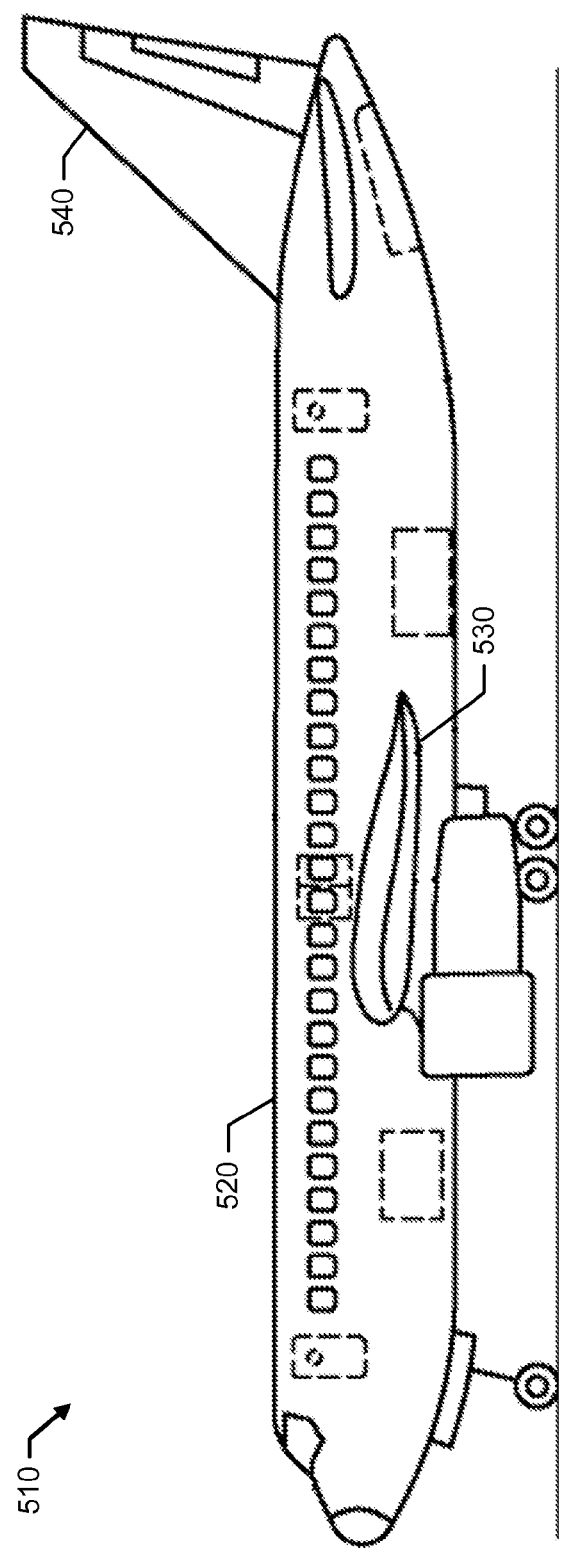
FIG. 5 is an illustration of an aircraft.

Reference is made to FIG. 5, which illustrates another example: an aircraft 510. The aircraft includes a fuselage 520, wing assemblies 530, and empennage 540, which contain various cavities that may be excited to produce an electric field having random distribution of field amplitude and polarity.

As a first example, the wing assemblies 530 include wing boxes that contain fuel tanks. Given their size, the fuel tanks may be excited with microwave energy. Interior surfaces of the fuel tanks are made of a material (e.g., aluminum, carbon fiber reinforced plastic) that reflects microwave energy. As the fuel tank is being excited with microwave energy, the movement of the fuel within the tank and structural flexure due to dynamic structural and aerodynamic loading will cause fluctuations in the electric field, resulting in randomized distribution of field amplitude and polarity. Dead zones in the fuel tank may move around due to the movement of fuel and structural flexure.

These conditions are used advantageously to measure different physical parameters in the fuel tank. Examples of the physical quantities include, but are not limited to, temperature, moisture content, fuel level, oxygen level, pressure, and strain.

Figure 6:
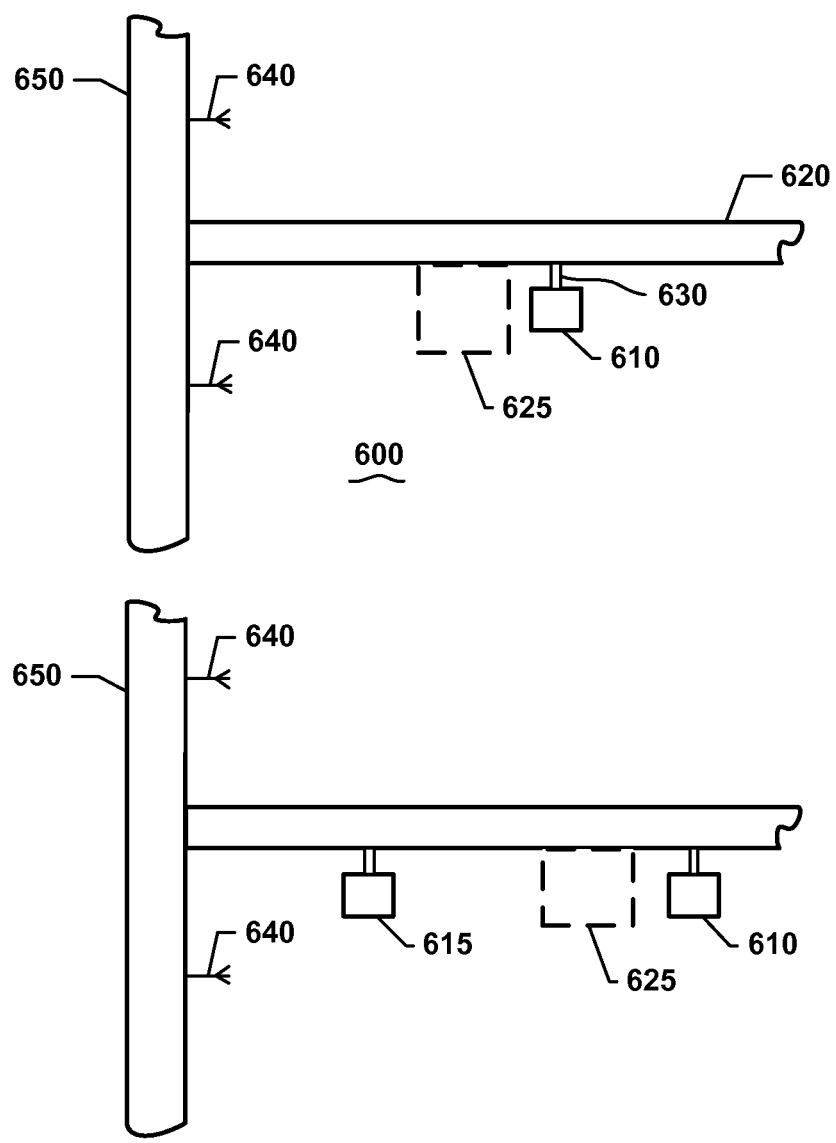
FIG. 6 is an illustration of a wing assembly including a fuel tank and a plurality of sensors.

Additional reference is made to FIG. 6. Physical quantities within the fuel tank 600 are measured by a plurality of sensors 610 having a plurality of antennas for wirelessly harvesting operating power along different paths within the fuel tank 600. The sensors 610 are mounted within the fuel tank 600. The sensors 610 may be mounted to ribs 620 via dielectric stand-offs 630.

The sensors 610 within the fuel tank 600 do not store any appreciable amount of energy due to limited energy storage allowed on the sensor in a fuel environment. For instance, the sensors 610 may store no more than about 200 microjoules of energy. Federal regulations prohibit power storage devices such as batteries and supercapacitors from being located within a fuel tank.

Excitation is applied by a source of power (not shown) and one or more transceivers (not shown) and radiating elements 640. The power source is located outside the fuel tank 600, and the radiating elements 640 are located inside the fuel tank 600. Each transceiver may be located inside or outside the fuel tank 600.

As a first example, a single radiating element provides a single band of microwave excitation to the entire fuel tank 600. All sensors 610 harvest energy along different paths with the fuel tank. Thus, the all sensors 610 receive power regardless of obstructions 625 to line of sight.

As a second example, multiple radiating elements 640 provide a single band of microwave excitation to the fuel tank 610 (this example is illustrated in FIG. 6). This arrangement guarantees coverage across the fuel tank 600. In certain instances, it may also allow for a direct line of sight to a radiating element 640. If its line of sight path is not obstructed, a sensor 615 having its antenna aligned with the radiating element may 640 be used instead of a sensor 610 that harvests energy along multiple paths.

As a third example, multiple radiating elements 640 provide excitation at different frequency bands. The antennas of each sensor 610 are tuned to one of these different frequencies. For instance, sensors 610 placed in the wing near the wing root sees a very large cavity, whereas sensors 610 placed in the wing tip see a substantially smaller cavity. Excitation at first and second frequencies f1 and f2 is applied to the wing. Antennas of sensors 610 near the wing root are tuned to the first frequency f1 and may also be tuned to the second frequency f2. Antennas of sensors 610 in the wing tip are tuned only to the second frequency f2. In the alternative, sensors 610 in the wing tip have some antennas tuned to the first frequency f1 and other antennas tuned to the second frequency f2. If a wing tip sensor 610 detects degradation in performance, it may switch channels and operate at the second frequency.

The radiating elements 640 may be located along and mounted to a wing spar 650. The fuel tank 600 may be penetrated to get the wired power to the radiating elements 640.

In some embodiments, the radiating elements 640 are used to provide power only. Bi-directional data communications would be performed by a separate system. In other embodiments, the radiating elements 640 may also handle bi-directional data communications and commands.

Data measurements may be communicated to avionics (e.g., a flight computer) in a remote location of the aircraft (e.g., an avionics bay). The communications may be performed via wires, or the communications may be performed wirelessly. Wireless transmissions maybe propagated, for instance, over a wireless bus formed by one or more aircraft components having properties of an electromagnetic cavity as described in Bommer U.S. Pat. No. 8,026,857.

Thus, power is supplied to fuel tank sensors without having to run wires across the fuel tank 600. Elimination of wires reduces weight, which reduces aircraft operating costs. Installation time is also reduced, since complex routing of wires inside the fuel tank 600 is eliminated. In addition, inspection of wires within the fuel tank 600 is avoided, which reduces maintenance costs.

With respect to an aircraft, a system and method herein are not limited to the fuel tank. As a second example, a system and method herein may be applied to a passenger cabin in an aircraft fuselage.

Interior surfaces of the passenger cabin are made of a material that reflects microwave energy. As the passenger cabin is excited with microwave energy, the movement of passengers within the cabin and structural flexure due to dynamic structural and aerodynamic loading will cause fluctuations in the electric field, resulting in randomized distribution of field amplitude and polarity.

These conditions are used advantageously to measure different physical parameters (e.g., cabin pressure and temperature) in the passenger cabin. Sensors may be mounted, for example, above ceiling panels, under seats, and in galleys. One or more antennas in the cabin may be connected to a cabin sensing system (which is a component in the avionics bay).

Some antennas of the sensors in the cabin may be tuned to the frequency of wireless devices commonly found in the cabin (e.g., Wi-Fi devices). Thus, power may be harvested from these wireless devices passively in the background.

Sensing herein is not limited to fuel tanks and passenger cabins of an aircraft. Other examples include, but are not limited to below-deck galleys, avionics bays, cargo sections, ducts, and airframe stiffening substructure (e.g., stringers).

The invention claimed is:

1. A vehicle comprising a fuel tank that reflects electromagnetic energy therein; an excitation source including a radiating element configured to provide excitation at a predetermined frequency band within the fuel tank, the excitation source and the fuel tank configured to excite the fuel tank to behave as a reverberant cavity within the fuel tank and create within the fuel tank an electric field having a randomized distribution of field amplitude and polarity; and a fuel tank sensor mounted within the fuel tank, the sensor having a plurality of antennas for wirelessly harvesting energy along different paths within the tank, at least one of the plurality of antennas tuned to the predetermined frequency band of the radiating element.

2. The vehicle of claim 1, wherein the fuel tank has changing boundary conditions that cause the electric field to have the randomized distribution.

3. The vehicle of claim 1, wherein the fuel tank sensor includes a circuit for combining the power harvested from the plurality of antennas to create combined power.

4. The vehicle of claim 3, wherein the fuel tank sensor includes a transducer for using the combined power to perform a measurement.

5. The vehicle of claim 4, wherein the fuel tank sensor further includes a data transmitter operated by the combined power.

6. The vehicle of claim 1, wherein the fuel tank sensor is configured to become non-operational during an energy fade within the cavity.

7. The vehicle of claim 6, wherein the fuel tank sensor stores no more than 200 micro joules of energy.

8. The vehicle of claim 1, wherein the excitation source includes a power supply outside of the cavity and wherein the radiating element is disposed within the cavity for exciting the cavity with electromagnetic energy.

9. The vehicle of claim 1, wherein the plurality of antennas have different planes and orientations.

10. The vehicle of claim 9, wherein the plurality of antennas are spatially displaced and orthogonally oriented.

11. The vehicle of claim 10, wherein the plurality of antennas are spatially displaced by a fraction of a wavelength at frequency of the electromagnetic energy.

12. The vehicle of claim 1, wherein the plurality of antennas are tuned to different frequency bands.

13. The vehicle of claim 1, further comprising at least one additional sensor in the cavity, each additional sensor having another plurality of antennas for wirelessly harvesting operating power along different paths within the cavity.

14. The vehicle of claim 13, wherein different antennas of at least one sensor are tuned to different available frequencies.

15. The vehicle of claim 13, wherein all of the antennas of at least one sensor are tuned to a specific frequency.

16. The vehicle of claim 13, wherein different sensors are tuned to different frequencies to exploit a physical constraint of the cavity.

17. The vehicle of claim 1, further comprising an aircraft passenger cabin.

18. An aircraft comprising a fuel tank contained within a wing box, the fuel tank reflecting electromagnetic energy therein; an excitation source for producing an electric field in the fuel tank, the excitation source including a radiating element configured to provide excitation at a predetermined frequency band within the fuel tank, the excitation source and the fuel tank configured to excite the fuel tank to behave as a reverberant cavity within the fuel tank; and a plurality of fuel tank sensors within the fuel tank, at least some of the fuel tank sensors having a plurality of antennas for wirelessly harvesting operational power incident from multiple directions and orientations within the tank, at least one of the plurality of antennas tuned to the predetermined frequency band of the radiating element.

19. The aircraft of claim 18, wherein wires penetrate spars of the wing box and terminate at radiating elements inside the fuel tank.

20. The aircraft of claim 18, further comprising a passenger cabin and a plurality of cabin sensors within the cabin, at least some of the cabin sensors having a plurality of antennas for wirelessly harvesting energy along different paths within the cabin.

* * * * *